United States Patent [19]

Konshak

[11] Patent Number: 4,736,356
[45] Date of Patent: Apr. 5, 1988

[54] OPTICAL DISK DRIVE

[75] Inventor: Michael V. Konshak, Colorado Springs, Colo.

[73] Assignee: Optotech, Inc., Colorado Springs, Colo.

[21] Appl. No.: 885,217

[22] Filed: Jul. 14, 1986

[51] Int. Cl.$^4$ .......................... G11B 1/00; G11B 17/04
[52] U.S. Cl. ..................................... 369/772; 360/99; 369/79
[58] Field of Search ................. 369/75.1, 292, 75.2, 369/77.1, 77.2; 360/99

[56] References Cited

U.S. PATENT DOCUMENTS

| | | | |
|---|---|---|---|
| 3,940,148 | 2/1976 | Torrington et al. | 369/79 |
| 4,135,721 | 1/1979 | Cametik | 369/268 |
| 4,326,284 | 4/1982 | Elliott | 369/77.2 |
| 4,517,617 | 5/1985 | Tsuji et al. | 360/133 |
| 4,519,055 | 5/1985 | Gilson | 369/37 |
| 4,545,045 | 10/1985 | Baer et al. | 369/77.2 |
| 4,545,046 | 10/1985 | Jansen | 369/111 |

Primary Examiner—Steven L. Stephan
Attorney, Agent, or Firm—Kinney & Lange

[57] ABSTRACT

An optical disk drive of the type adapted to use an optical disk cartridge formed by an optical disk mounted about a hub within an enclosure. When inserted into the optical disk drive, the cartridge is received and supported by a pan. A control handle for controlling the disk drive can be rotated between a load position, a run position, a spin-down position, and an eject position. The handle is coupled to the pan by a linkage. When the handle is rotated to either its run or spin-down positions, the linkage positions the pan at a run/spin-down position at which the hub of the disk is engaged with a drive spindle. When rotated to either its load or eject positions, the linkage causes the pan to be in a load/eject position at which the cartridge can be inserted into or removed from the pan. The position of the handle is detected by optical sensors which provide signals representative thereof to control circuitry. The control circuitry activates a drive motor when the handle is in its run position, and deactivates the drive motor when the handle is moved to its spin-down position. A spin-down interlock mechanism is interfaced to the control circuitry and permits the handle to be rotated from the run position back to the load and eject positions only after a predetermined spin-down time period has elapsed after the handle has been rotated to the spin-down position. The cartridge is ejected from the disk drive when the handle is rotated to its eject position.

32 Claims, 10 Drawing Sheets

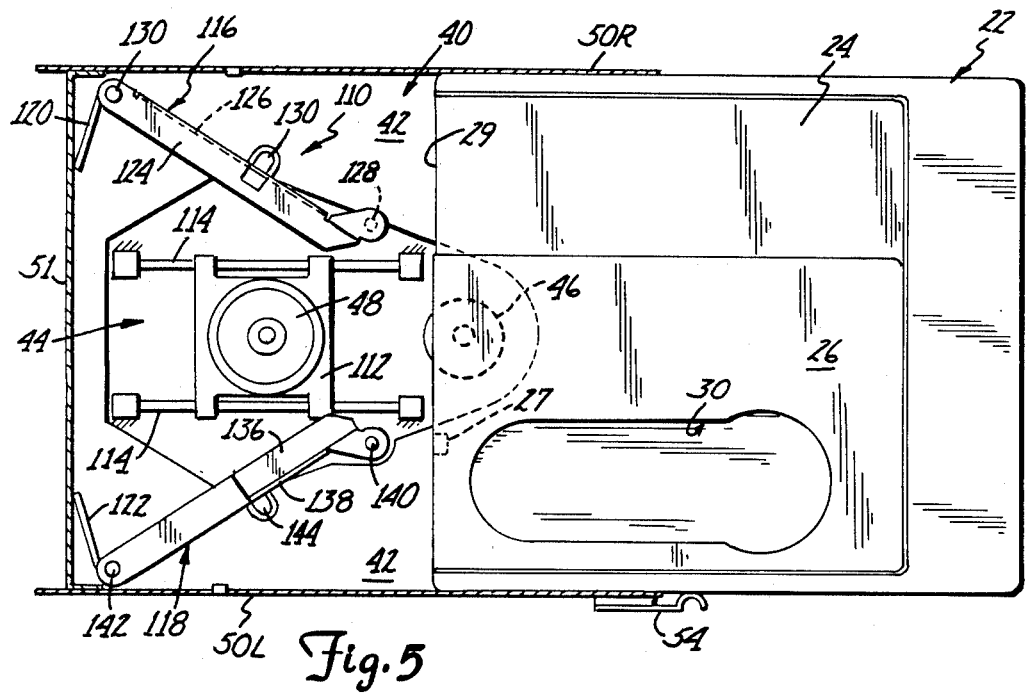
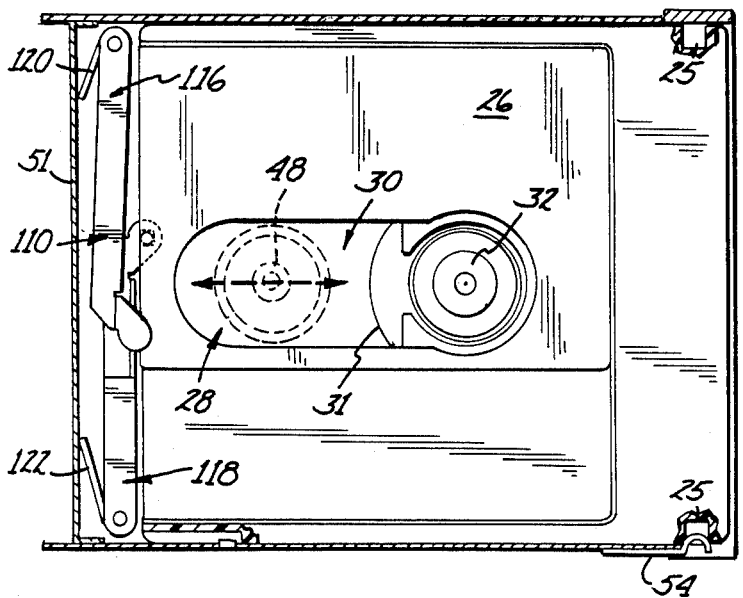
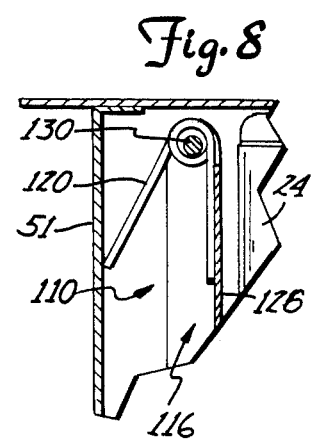

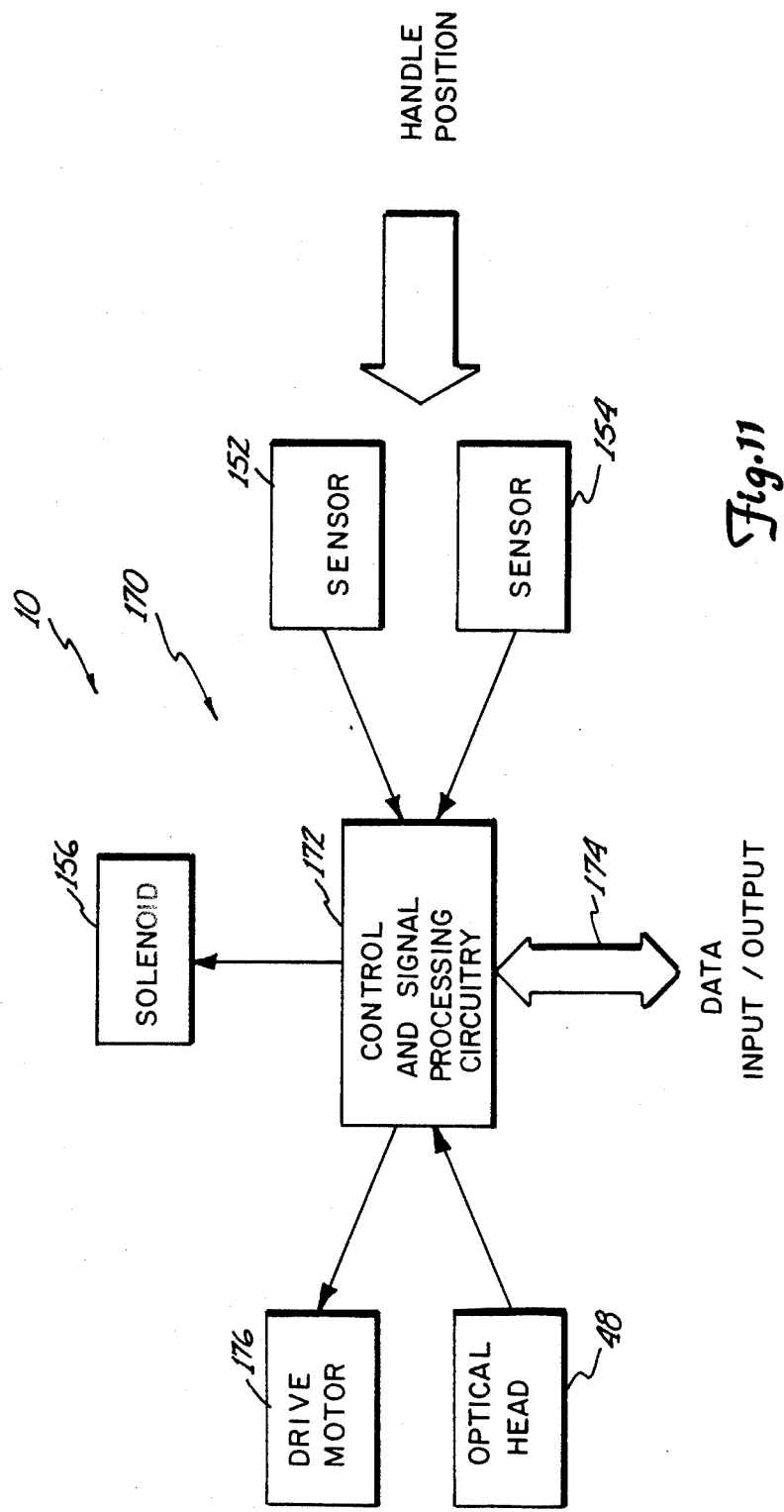

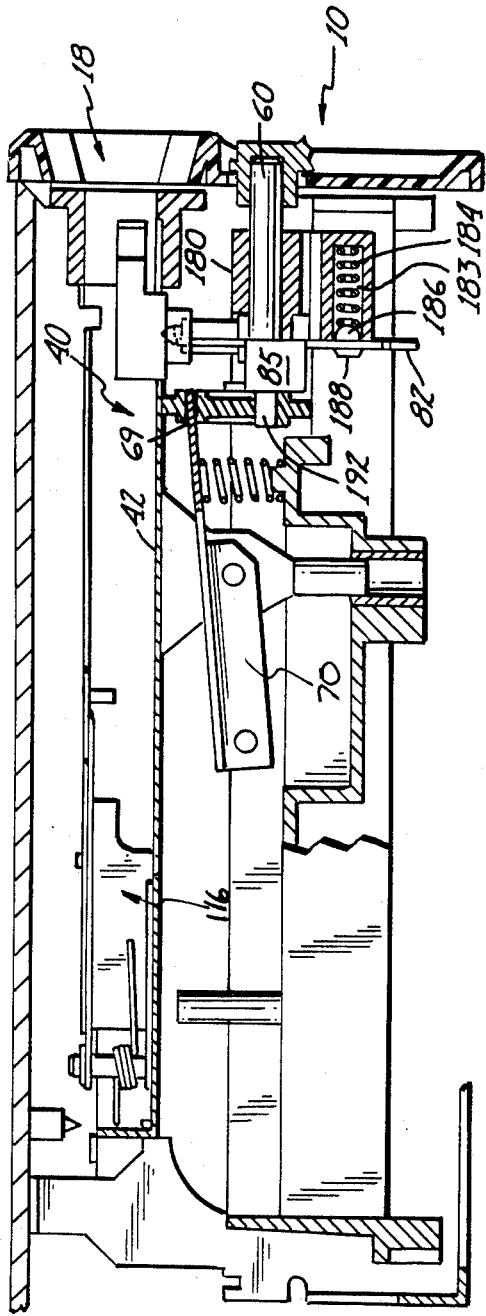
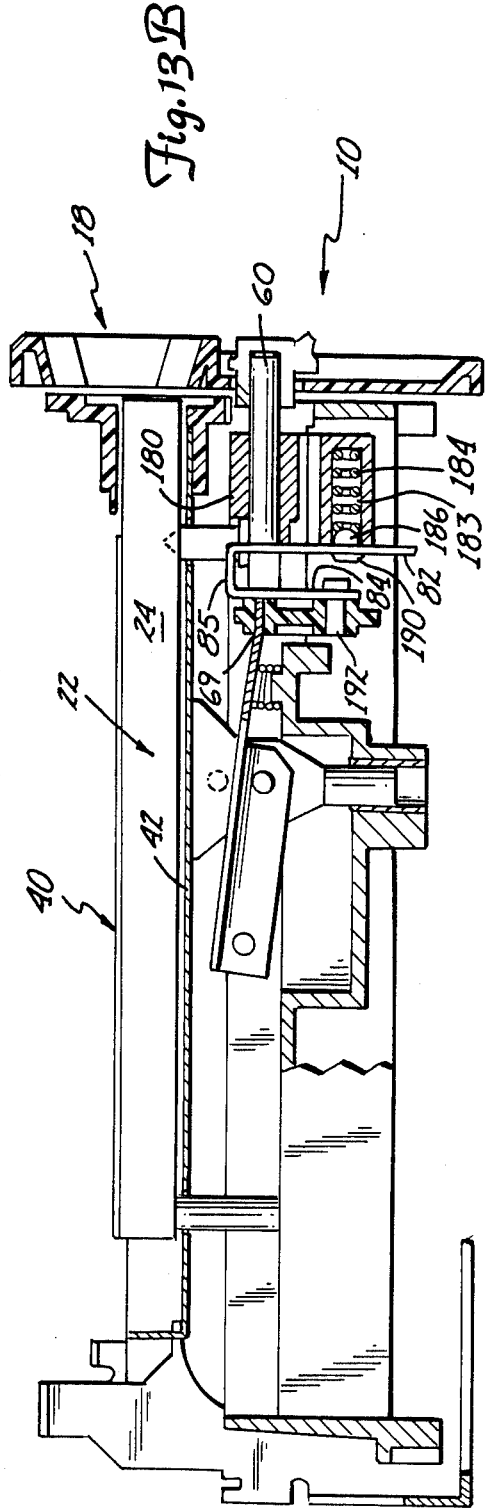

OPTICAL DISK DRIVE

BACKGROUND OF THE INVENTION

1. Field of the Invention

The present invention relates to drive apparatus for disk-type recording media. In particular, the present invention is an optical disk drive.

2. Description of the Prior Art

The demand for mass data storage continues to increase with expanding data processing operations and personnel computer use. Optical data storage systems are becoming an increasingly popular means for meeting this need. With systems of this type, extremely large quantities of data can be stored and quickly accessed at relatively low cost.

Optical data storage systems include an optical record carrier or disk for storing information in digital form. For purposes of convenience and protection, the disk is typically positioned within an enclosure to form a cassette. The cassette is loaded into an optical disk drive which is interfaced to the personal computer or other data processing system and includes the mechanical and electrical subsystems required to write data to and read data from the optical disk. The operation of electrical subsystems of the disk drive are typically within the exclusive control of the data processing system to which the disk drive is interfaced.

There is a continuing need for improved optical disk drives. Standard optical disk cartridges utilize a 5¼" disk. In order to receive a cartridge of this size, yet still be small enough to be conveniently used in conjunction with a personal computer, mechanical and electrical subsystems of the disk drive must be located above or below the disk rather than on its side. The mechanical subsystems must be compact, reliable and have relatively few parts, while at the same time perform many different functions. Operational status of the disk drive should be clearly visible to an operator. It would also be advantageous if an operator could directly control the disk drive rather than the computer. Any such control operations would have to be implemented in a fail-safe manner to prevent the loss of data or damage to the disk.

SUMMARY OF THE INVENTION

The present invention is an optical disk drive of the type utilizing an optical disk cartridge formed by an optical disk amounted about the hub within an enclosure. The optical disk drive includes a drive spindle adapted to engage the hub of the optical disk, and a drive motor for rotating the drive spindle. Pan means receive and support the optical disk cartridge. A handle having a load position, a run position, and a spin-down position is coupled to the pan means by linkage means. The linkage means moves the pan between a load/eject position at which the cartridge can be inserted into and removed from the pan means when the handle is in its load position, and a run/spin-down position at which the hub of the disk is engaged with the spindle when the handle is in its run and spin-down positions. Control means responsive to the position of the handle activate the drive motor when the handle is in the run position, and deactivate the motor when the handle is in the spin-down position.

In preferred embodiments, the handle also includes an eject position. The linkage means causes the pan means to be in its load/eject position when the handle is in its eject position. Also included are eject means for ejecting the cassette from the pan means when the handle is in the eject position.

The linkage means includes a shaft which is rotated about a horizontal axis by the handle. A cam pin is spaced from and fixedly mounted with respect to the shaft. The cam follower is adapted to receive the cam pin, and is coupled to the pan means by a yoke. The cam follower converts rotational motion of the handle to generally linear motion of the pan means between its load/eject and run/spin-down positions.

In still other embodiments, the optical disk drive includes spin-down interlock means coupled to the control means for preventing movement of the handle from the run position to the load position unless the handle is first moved to the spin-down position. The spin-down interlock means permits the handle to be moved from the run position to the load position only after a predetermined spin-down time period has elapsed after the handle is moved to the spin-down position. During the spin-down time period, read and write procedures in progress are completed, and rotation of the disk stopped.

The optical disk drive is compact, reliable, and formed of relatively few parts. The mechanical subsystem is located below the optical disk cartridge. All operations of the disk drive are easily controlled by the handle. Using the handle, an operator can stop the operation of the disk drive and remove the cartridge without losing data and having the drive operate through a personal computer.

BRIEF DESCRIPTION OF THE DRAWINGS

FIG. 5 is a top view of the pan shown in FIG. 4 illustrating a door opening mechanism and an optical disk cartridge being inserted into the pan.

FIG. 7 is a top view of the pan shown in FIG. 4 with an optical disk cartridge fully inserted therein.

FIG. 8 is a detailed sectional view of a rear portion of the right arm of the door opening mechanism shown in FIGS. 5 and 7.

FIG. 11 is a block diagram representation of an electrical subsystem for the disk drive of the present invention.

FIG. 13A is a sectional view of the disk drive taken from the side and illustrating the pan in its load/eject position.

FIG. 13B is a sectional view of the disk drive taken from the side and illustrating the pan in its run/spin-down position.

DETAILED DESCRIPTION OF THE PREFERRED EMBODIMENTS

Figure 1:
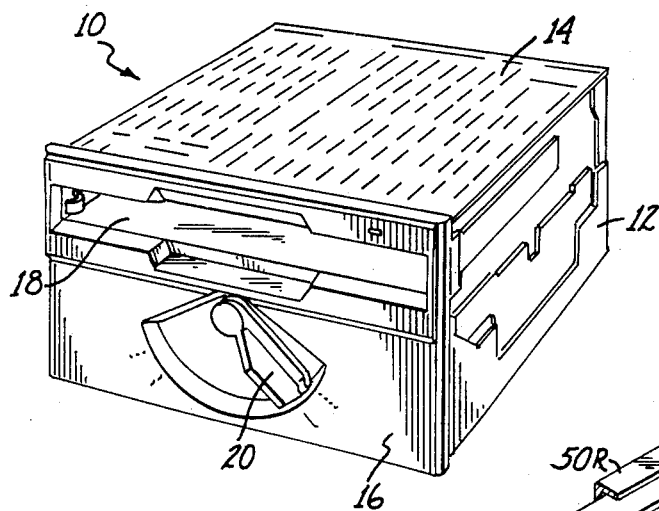
FIG. 1 is a perspective view illustrating the optical disk drive of the present invention.

Optical disk drive 10 of the present invention is illustrated generally in FIG. 1. Mechanical and electrical subsystems of disk drive 10 are compactly mounted within an enclosure 12 which is adapted to be positioned within a personal computer (not shown). Many components of the electrical subsystem of disk drive 10 are mounted to circuit board 14 which is positioned on the top of enclosure 12. Bezel 16 is positioned on a front face of enclosure 12 and includes an opening 18 which is adapted to receive an optical disk cartridge. A user controls the operation of disk drive 10 by means of handle 20. Handle 20 also provides a visual indication of the operational state of disk drive 10.

Figure 2:
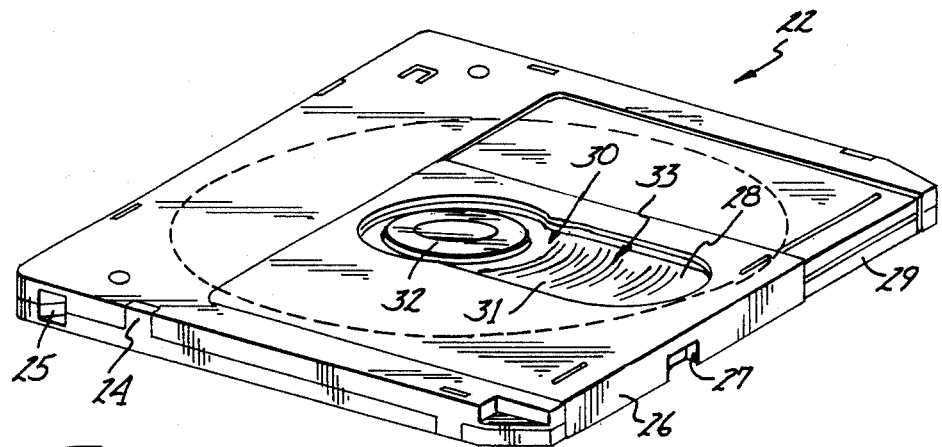
FIG. 2 is a perspective view of an optical disk cartridge adapted for use with the optical disk drive of the present invention and shown with its door in an open position.
Figure 3:
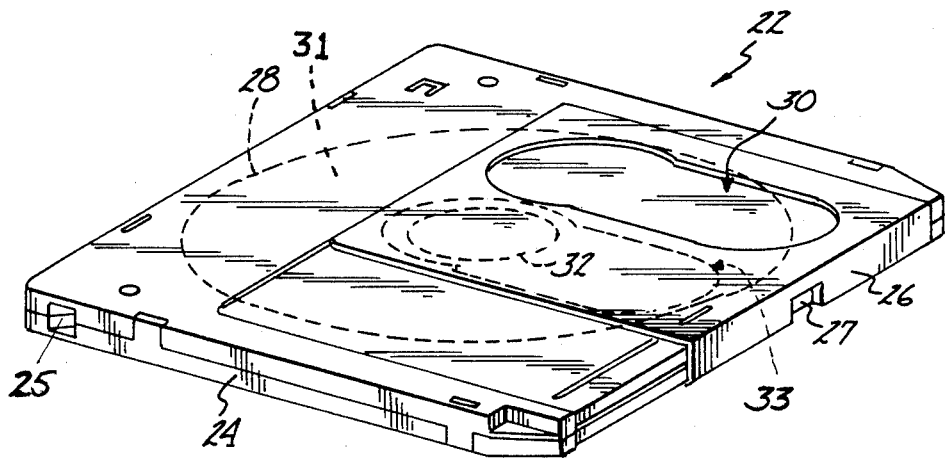
FIG. 3 is a perspective view of the optical disk cartridge shown in FIG. 2 with its door in a closed position.

Disk drive 10 is adapted to use an optical disk cartridge 22 such as that shown in FIGS. 2 and 3. Cartridge 22 is comprised of an enclosure 24, a sliding door 26, and an optical disk 28 which is positioned within enclosure 24. The perimeter of optical disk 28 is illustrated in phantom in FIGS. 2 and 3. Optical disk 28 includes a recording surface 31 which is mounted about a hub 32. Both sides of enclosure 24 include a recess 25 (not one side is shown) into which a retainer clip (not shown) will fit to secure cartridge 22 once it is inserted into a disk drive 10.

Although only one side of enclosure 24 and door 26 is shown in FIGS. 2 and 3, the opposite sides of these elements are identical. Door 26 includes a recess 27 which is grasped by a door opening mechanism (FIGS. 5–8) to slide the door to its open position. Both sides of door 26 include an opening 30. When in its open position, as shown in FIG. 2, openings 30 of door 26 will be positioned over openings 33 of similar size and shape in both the bottom and top of enclosure 24, thereby exposing hub 32 and recording surface 31 of optical disk 28. When cartridge 22 is not in use, door 26 is biased by a spring (not shown) to a closed position shown in FIG. 3, covering opening 33 and completely enclosing optical disk 28 within enclosure 24 for protection.

Figure 4:
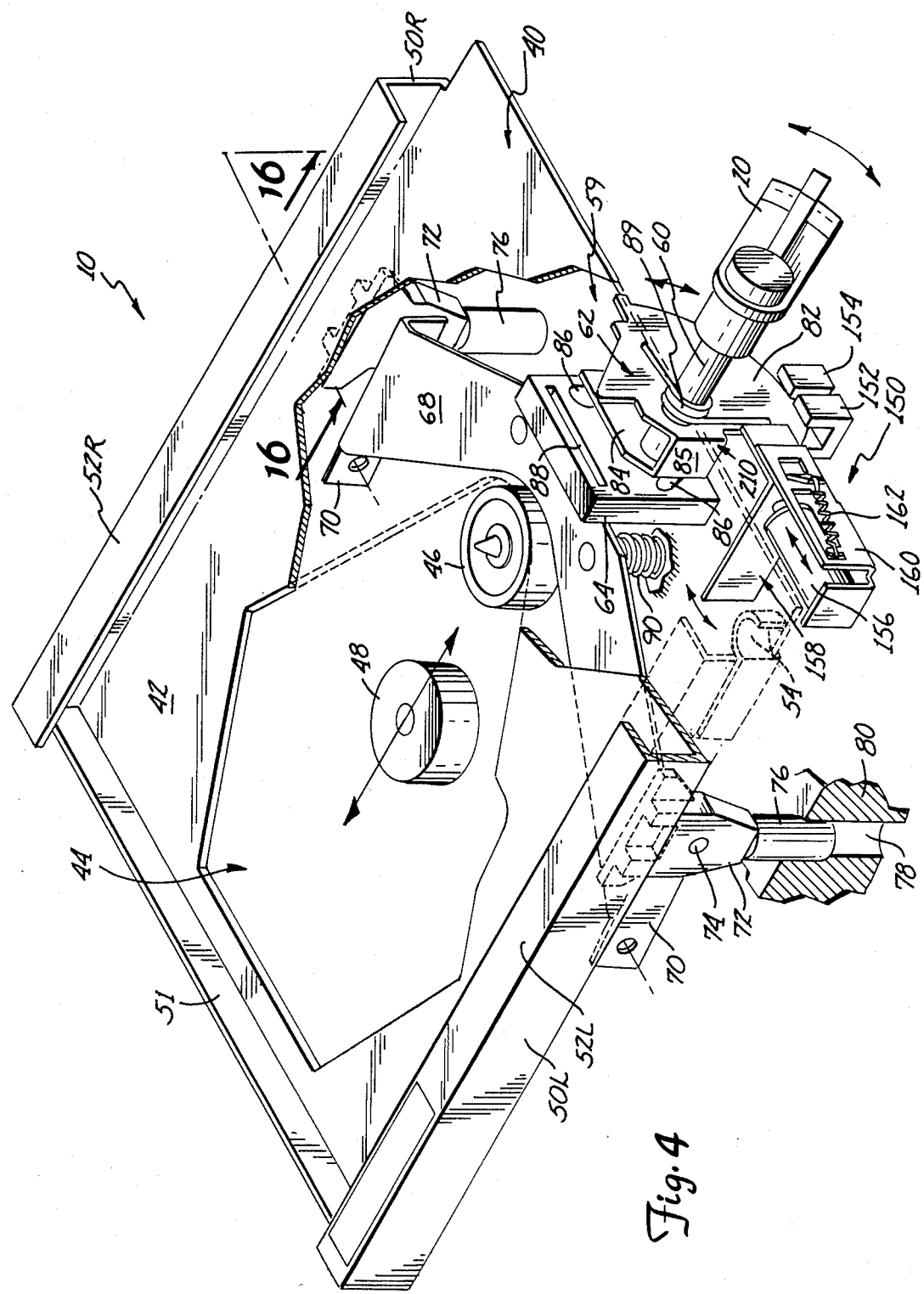
FIG. 4 is a perspective view of a mechanical subsystem of the optical disk drive with portions thereof shown in section and phantom.

A mechanical subsystem of disk drive 10 can be described generally with reference to FIG. 4. When inserted into disk drive 10 through window 18 (FIG. 1), cartridge 22 will be positioned upon a support assembly such as pan 40. In the embodiment shown in FIG. 4, pan 40 includes a tray 42 which is oriented in a generally horizontal plane and has an opening 44 in a portion thereof. Opening 44 is positioned in such a manner so as to permit access to optical disk 28 by drive spindle 46 and optical head 48. As is shown in FIG. 5, optical head 48 is mounted to a sled 112 which can be radially positioned with respect to spindle 46 about guide rods 114. Pan 40 also includes left and right side walls 50L and 50R, and flanges 52L and 52R, respectively. Together with tray 42, side walls 50L, 50R and flanges 52L, 52R serve as a guide to properly position cassette 22 within pan 40.

Figure 9:
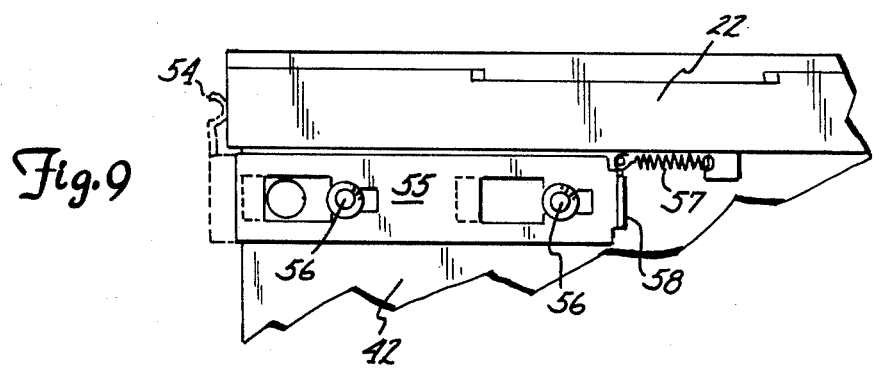
FIG. 9 is a view from the bottom of the pan shown in FIG. 4 illustrating in detail the eject mechanism.
Figure 16:
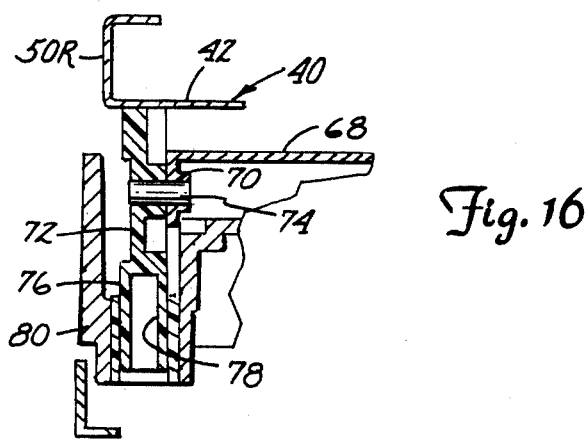
FIG. 16 is a detailed sectional view of the mechanical subsystem shown in FIG. 4 and taken along lines 16—16.
Figure 12A:
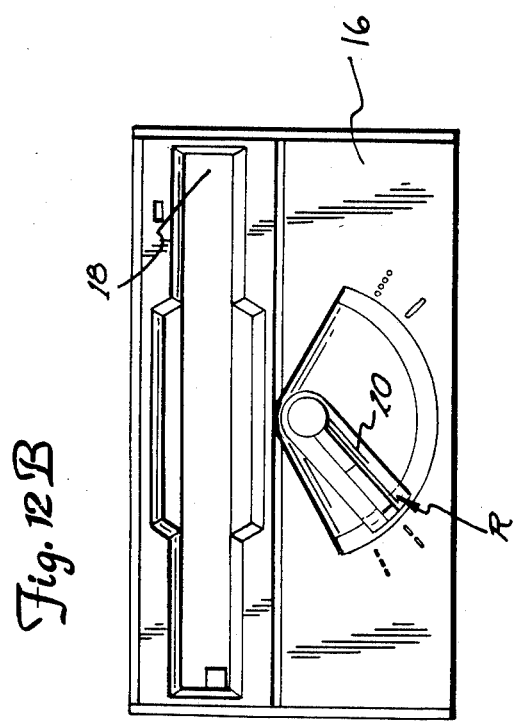
FIG. 12A is a front view of the disk drive with the handle shown in the load position.
Figure 12B:
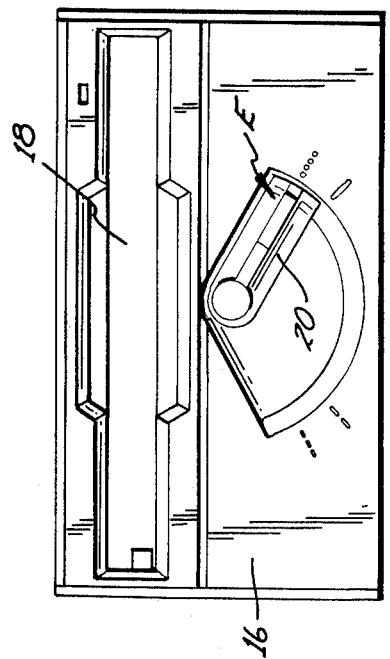
FIG. 12B is a front view of the disk drive with the handle shown in the run position.
Figure 12C:
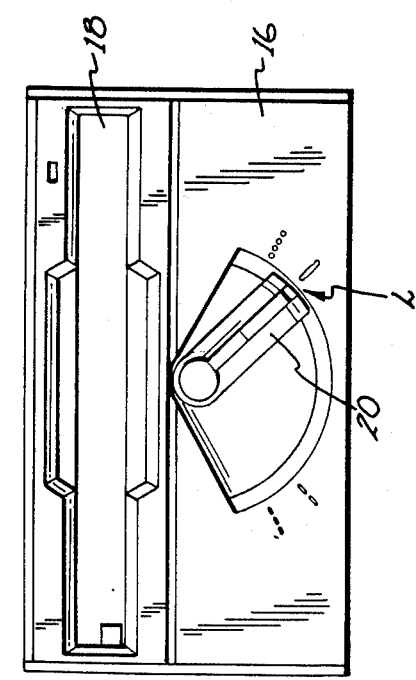
FIG. 12C is a front view of the disk drive with the handle shown in the spin-down position.
Figure 12D:
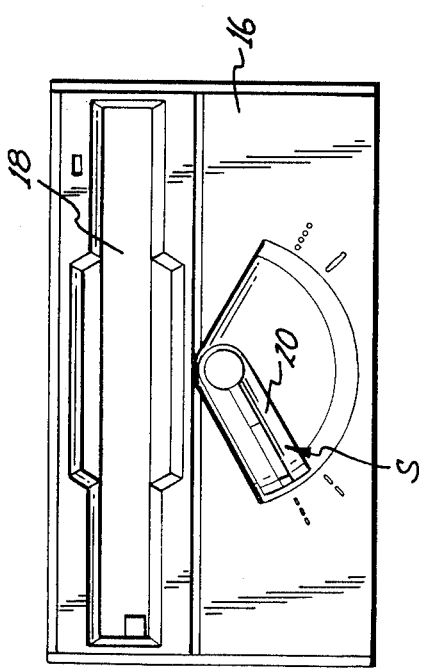
FIG. 12D is a front view of the disk drive with the handle shown in the eject position.

Cartridge 22 is securely held within pan 40 by a retainer clip 54 which fits within recess 25 (FIGS. 2 and 3) when cartridge 22 is properly positioned. Retainer clip 54 is U-shaped in the embodiment shown, and extends into pan 40 from side wall 50L. As shown in FIG. 9, retainer clip 54 is mounted to arm 55 which in turn is slidably mounted to a bottom side of tray 42 by means of guide lugs 56. Retainer clip 54 and arm 55 are biased toward a center of tray 42 by spring 57. Extending downward from arm 55 at an end opposite retainer clip 54 is a lip 58 which is actuated to force retainer clip 54 and arm 55 to a retracted position (shown in phantom), permitting cartridge 22 to be ejected or removed from pan 40.

Referring again to FIG. 4, handle 20 is shown coupled to pan 40 by linkage assembly 59 which includes shaft 60, cam 62, cam pin 192 (not visible in FIG. 4), cam follower 64 and yoke 68. Yoke 68 is positioned below tray 42 and extends between side walls 50L and 50R of pan 40. Sides of yoke 68 are terminated in flanges 70 which are pivotally connected to guides 72 by means of pivot pins 74. Shaft portions 76 of guides 72 are positioned within bores 78 of chassis 80, and are adapted for vertical movement with respect to the chassis.

A longitudinal and rotational axis of shaft 60 is oriented in a generally horizontal plane parallel to a longitudinal axis of pan 40. Handle 20 and cam 62 are both fixedly mounted to shaft 60. In the embodiment shown, cam 62 includes a front cam plate 82 and a rear cam plate 84 which are coupled by plate member 85. Extending from the back side of rear cam plate 84 and displaced from the rotational axis of shaft 60 is cam pin 192 (shown in FIGS. 13A and 13B) which fits within slot 86 of cam follower 64. Cam follower 64 also includes a slot 88 which receives tongue 69 (shown in FIGS. 13A and 13B) of yoke 68. As handle 20 is rotated, cam pin 192 will travel within slot 86 of cam follower 64 causing the cam follower to move up and down in a generally vertical direction. The vertical motion of cam follower 64 is transferred to pan 40, and therefore optical disk cartridge 22, by means of yoke 68. A spring 90 is positioned between yoke 68 and chassis 80 to provide damping for this motion.

Figure 10:
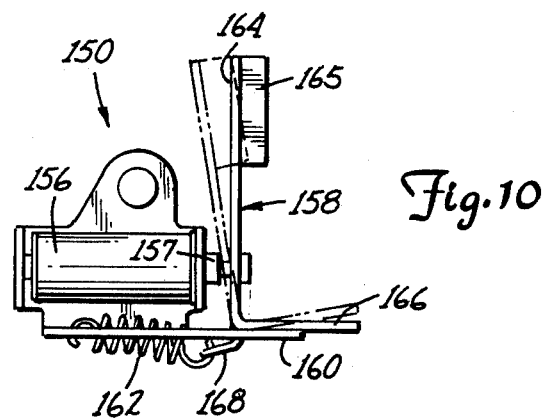
FIG. 10 is a detailed view of the spin-down interlock mechanism shown in FIG. 4.

Disk drive 10 includes a spin-down interlock mechanism 150 which, as will be described in greater detail in subsequent portions of this specification, allows optical disk 28 and spindle 46 to stop spinning and come to rest before cartridge 22 can be removed. As shown in FIGS. 4 and 10, spin-down interlock mechanism 150 includes a solenoid 156, lever arm 158, bracket 160 and spring 162. Lever arm 158 is shaped generally in the form of an "L", and has an arm portion 164 with a lip 165 extending therefrom, a leg 166, and a tab 168. Lever arm 158 pivots about tab 168 which extends through a hole in bracket 160. Lever arm 158 is normally biased by spring 162 to a position at which leg 166 is parallel to bracket 160, with lip 165 positioned below edge 210 of plate member 85 (perhaps best shown in FIG. 14C). When solenoid 156 is actuated, its actuator arm 157 pivots lever arm 158, and retracts lip 165 to a position shown in phantom in FIG. 10.

Disk drive 10 also includes sensors 152 and 154 which provide signals representative of the position of arm 20 by sensing the position of front cam plate 82. In a preferred embodiment, sensors 152 and 154 are opto-electronic sensor devices which include an emitter and detector pair (not separately shown), spaced from one another on opposite sides of cam plate 82. Sensors 152 and 154 can thereby detect the presence or absence of various tabs on cam plate 82 which are indicative of the position of handle 20, and provide digital signals representative thereof.

A block diagram of electrical subsystem 170 of disk drive 10 is illustrated in FIG. 11. Operation of electrical subsystem 170 is coordinated by control and signal processing circuitry illustrated generally at 172. Control and signal processing circuitry 172 will preferably include a microprocessor (not shown). Input data to be written to optical disk 28, output data read therefrom, and various other control signals are communicated between a personal computer (not shown) and circuitry 172 by means of bus 174. As shown, sensors 152 and 154, solenoid 156, and optical head 48 are also interfaced to control and signal processing circuitry 172. A drive motor 176 which rotates spindle 46 is also interfaced to circuitry 172.

A door opening mechanism 110 which opens door 26 of cassette 22 as it is inserted into pan 40, is described with reference to FIGS. 5-8. Door opening mechanism 110 is formed by right and left arms 116 and 118, respectively, and coil springs 120 and 122. Arm 116 is formed by a first arm member 124, a second arm member 126, and pin 128. First arm member 124 forms a plane which is generally parallel to tray 42, while second arm member 126 extends in a generally perpendicular direction from member 124. A first end of arm 116 is pivotally mounted to tray 42 near a back right-hand side of pan 40 by means of pivot pin 130. First arm member 124 is spaced from plate 42 in such a manner that pin 128, which extends vertically downward from member 124, can fit within the recess 27 of door 26 when cartridge 22 is inserted into pan 40.

Second arm member 126 extends from pivot pin 130 for only a partial length of arm 116. As best shown in FIG. 8, spring 120 is wound around pivot pin 130 and has extensions which contact second arm section 126 and a rear wall 51 of pan 40. Arm 116 is thereby biased toward wall 50R of pan 40. Arm 116 also includes a stop lug 130 which extends downward from second arm member 126 and into opening 44. Stop lug 130 contacts tray 42 to support arm 116 at a rest position angled away from wall 50R at which pin 128 will contact recess 27 when cartridge 22 is positioned within pan 40 with door 26 in its closed position on the right-hand side (not shown in the figures).

Arm 118 is formed by first arm member 136, second arm member 138, and pin 140. Arm 118 is pivotally mounted to tray 42 by pivot pin 142 near the back left-hand side of pan 40. First arm member 136 is generally planar and is positioned parallel to and near tray 42, with pin 140 extending upward to fit within recess 27 of cartridge 22. Second arm member 138 is generally perpendicular to first arm member 136, and extends from pivot pin 142 for only a partial length of arm 118. A stop lug 144 extends downward from first arm member 136. Arm 118 is biased towards the left wall 50L of pan 40 by means of spring 142, but is held in an angled rest position with respect to the wall by stop lug 44 which contacts plate 42. When arm 118 is in its rest position as shown in FIG. 5, pin 140 will fit within recess 27 when cartridge 22 is slid into pan 40 with door 26 on the left-hand side in its closed position.

The operation of door opening mechanism 110 when cartridge 22 is inserted into pan 40 with its door 26 in the closed position toward the left-hand side of pan 40 is described with reference to FIGS. 5, 6 and 7. As cartridge 22 is slid into pan 40, recess 27 of door 26 will meet upward extending pin 140 of arm 118. Pin 128 of arm 116 will meet the back wall 29 of enclosure 24. Since arms 116 and 118 are angled inward toward a center of pan 40, they will continue to swing inward against the forces of springs 120 and 122, respectively, as cartridge 22 is further pushed into pan 40. As arm 118 swings inward, it will slide door 26 to the right so as to open the door and expose hub 32 and recording surface 31 of optical disk 28. Hub 32 will thereby be placed in contact with drive spindle 46 permitting optical disk 28 to be rotated. Optical head 48 can then be radially positioned about recording surface 31.

Arms 116 and 118 are configured in such a manner that they will not interfere with one another when they cross a center of pan 42, and so that they fit adjacent to each other and parallel to back wall 51 when cartridge 22 is fully inserted within pan 40 as shown in FIG. 7. As shown in FIG. 7, retainer clip 54 fits within recess 25 to secure cartridge 22 within pan 40 once it has been properly positioned therein.

Figure 6:
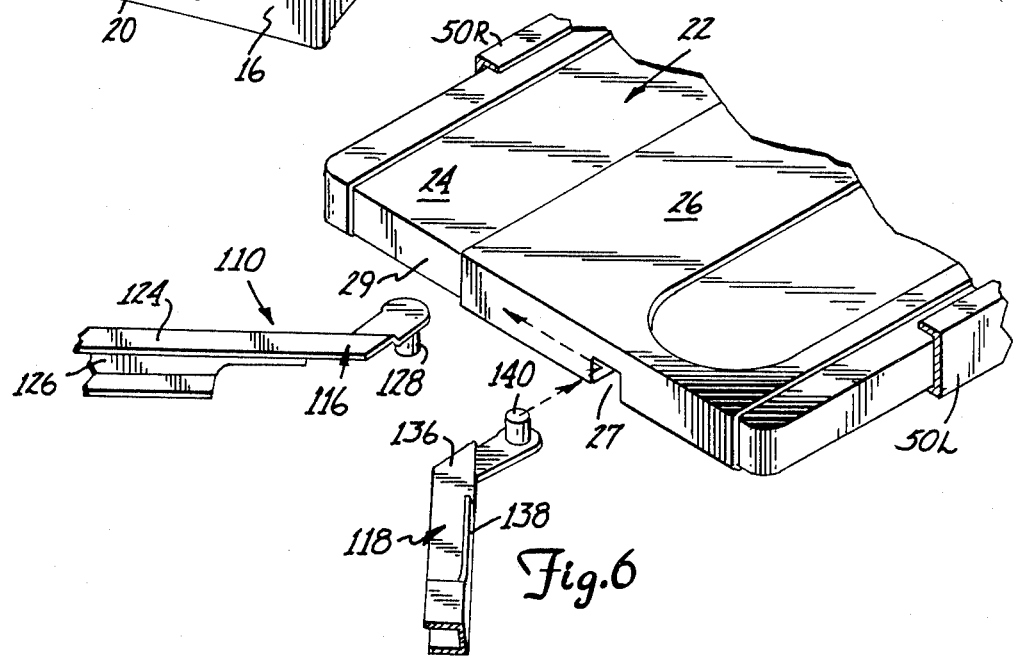
FIG. 6 is a view illustrating the interaction of the door opening mechanism and the door of the optical disk cartridge.

When cartridge 22 is in inserted in a position inverted with respect to that shown in FIGS. 5-7 (i.e., with door 26 facing the right side of pan 40 in its closed position), recess 27 of door 26 will be facing upward. Downwardly extending pin 128 of arm 116 will therefore meet recess 27, opening door 26 in an identical manner. When cartridge 22 is removed from pan 40, arms 116 and 118 will both return to their rest positions under the force of springs 120 and 122, respectively. Door 26 of cartridge 22 will also be forced to its closed position by a spring therein (not shown).

Referring to FIGS. 12A-12D, it can be seen that handle 20 can be moved to one of four positions. Handle 20 is shown in its load (L) position in FIG. 12A, in its run (R) position in FIG. 12B, in its spin-down (S) position in FIG. 12C, and in its eject (E) position in FIG. 12D. In response to the position of handle 20, the linkage assembly 59 will move pan 40 between one of two positions shown in FIGS. 13A and 13B. When handle 20 is in either of its load or eject positions, the linkage will cause pan 40 to be in the load/eject position shown in FIG. 13A. In its load/eject position, pan 40 is aligned with opening 18 to permit optical disk cartridge 22 to be inserted (loaded) or removed (ejected) therefrom. When handle 20 is rotated to either its spin-down or run positions, linkage assembly 59 will lower pan 40 to a run/spin-down position shown in FIG. 13B. When pan 40 is loaded with a cartridge 22 and positioned in its run/spin-down position, hub 32 of optical disk 28 will come into contact with spindle 46, and optical head 48 can access recording surface 31.

A description of the operation of disk drive 10 will be facilitated by the following description of linkage assembly 59 made with reference to FIGS. 13A-13B and 14A-14D. Shaft 60 is rotatably fastened to chassis 80 by means of bearing member 180. Bearing member 180 is secured to chassis 80 by screws 182. Also positioned within a cavity 183 of bearing member 180 is a detent assembly formed by spring 184 and ball 186. Spring 184 forces ball 186 against front cam plate 82. When handle 20 is moved to its load position, spring 184 will force ball 186 into load detent 188 of front cam plate 82, thereby maintaining pan 40 in its load/eject positon as shown in FIG. 13A. In a similar manner, when handle 20 is moved to its run position, ball 186 will be forced into run detent 190 of front cam plate 82, thereby holding pan 40 in its run/spin-down position as shown in FIG. 13B.

Circumferentially spaced indicia about front cam plate 82 are sensed to provide an indication of the position of handle 20. As best shown in FIGS. 14A-14D, front cam plate 82 includes a load tab 200, a run tab 202, an eject tab 204, and intermediate tab 206 between load tab 200 and run tab 202.

Cam pin 192 (best shown in FIGS. 13A and 13B) extends rearward through rear cam plate 84 and into slot 86 of cam follower 64. Cam pin 192 is fixed within rear cam plate 84 at a predetermined radial distance from shaft 60. When shaft 60 is rotated by handle 20, cam pin 192 will move within slot 62 and convert the rotational motion of the shaft and cam to vertical motion of cam follower 64. Cam follower 64 is illustrated in greater detail in FIGS. 15A-15D. The view of cam follower 64 in these figures is of the side facing handle 20. The position of handle 20 in FIGS. 15A-15D correspond to those of handle 20 in FIGS. 12A-12D, respectively, and also to the position of front cam plate 82 and pan 40 in FIGS. 14A-14D, respectively.

As shown in FIGS. 15A-15D, slot 86 in cam follower 64 has an elongated slot section 194 which extends horizontally across cam follower 64. On a right-hand side, as seen in FIGS. 15A-15D, slot 86 includes a slot section 196 which extends upward in a vertical direction from the right edge of slot section 194. On the left end of slot section 194 is a third slot section 198 which slopes upward and to the left in cam follower 64.

Figure 14A:
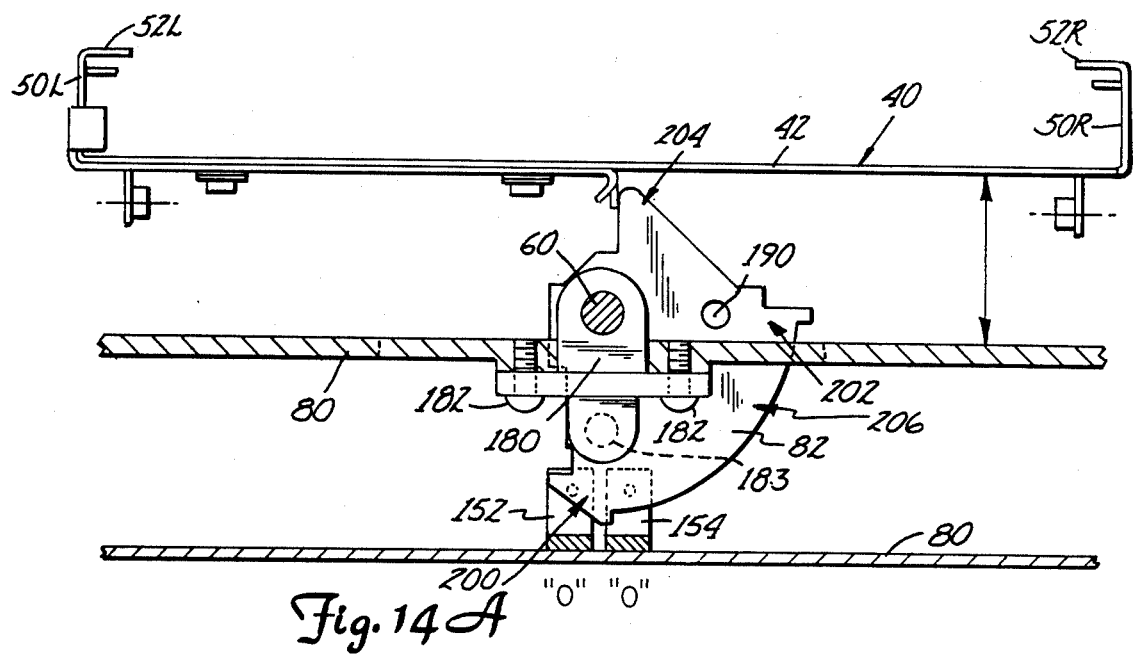
FIG. 14A is a sectional front view of the mechanical subsystem shown in FIG. 4 illustrating the position of the front cam plate when the handle is in the load position.

Cam pin 192 is positioned with respect to handle 20 and shaft 60 in such a manner that when handle 20 is in its load position (FIG. 12A), cam pin 192 will be all the way to the left within slot section 194 (FIG. 15A) forcing yoke 68 upward and pan 40 into its load/eject position (FIGS. 13A and 14A). As shown in FIG. 14A, front cam plate 82 will also be oriented with load tab 200 obstructing both sensors 152 and 154. Sensors 152 and 154 will therefore provide digital signals representative of a "0,0" sequence to control and signal processing circuitry 172 when handle 20 is in its load position.

Figure 15A:
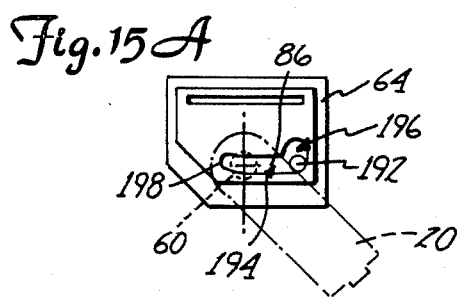
FIG. 15A is a view illustrating the relation between the cam follower and cam pin of the mechanical subsystem when the handle is in the load position.
Figure 15B:
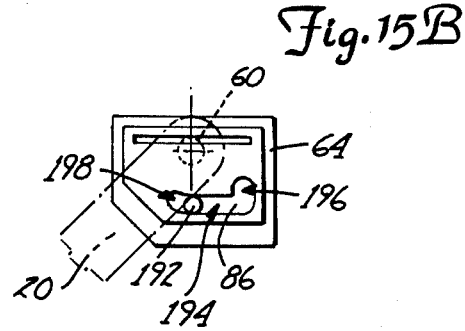
FIG. 15B is a view illustrating the relation between the cam follower and cam pin when the handle is in the run position.
Figure 15C:
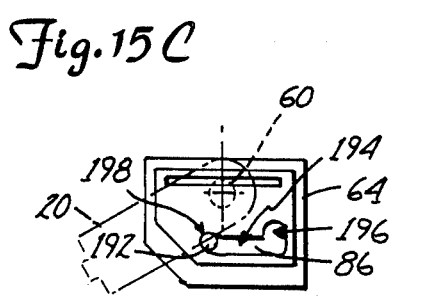
FIG. 15C is a view illustrating the relation between the cam follower and cam pin when the handle is in the spin-down position.
Figure 15D:
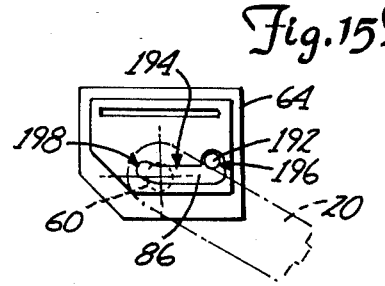
FIG. 15D is a view illustrating the relation between the cam follower and cam pin when the handle is in the eject position.
Figure 14C:
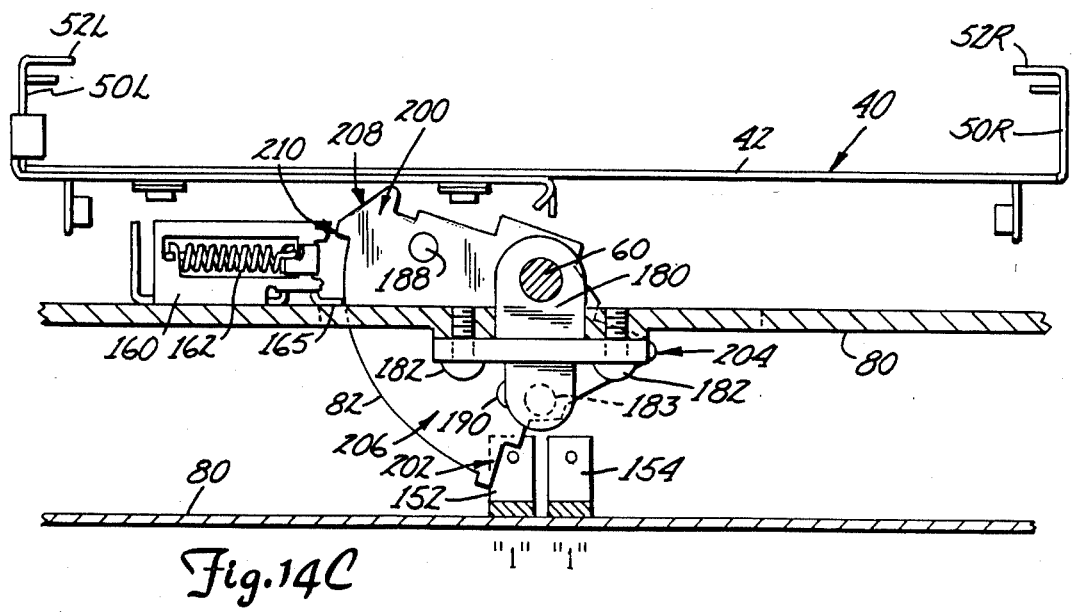
FIG. 14C is a front sectional view of the mechanical subsystem illustrating the front cam plate when the handle is in the spin-down position.

When arm 20 is rotated counterclockwise from its load position to its eject position (FIG. 12D), cam pin 192 will travel upward within slot section 196 without causing any movement of cam follower 64. (FIG. 15D). Pan 40 will therefore remain in its load/eject position. As shown in FIG. 14D, load tab 200 is configured in such a manner that it will be rotated clear of sensor 152 while still obstructing sensor 154. Sensors 152 and 154 will therefore provide digital signals representative of "1,0" sequence to control and signal processing circuitry 172 when handle 20 is in its eject position.

Figure 14B:
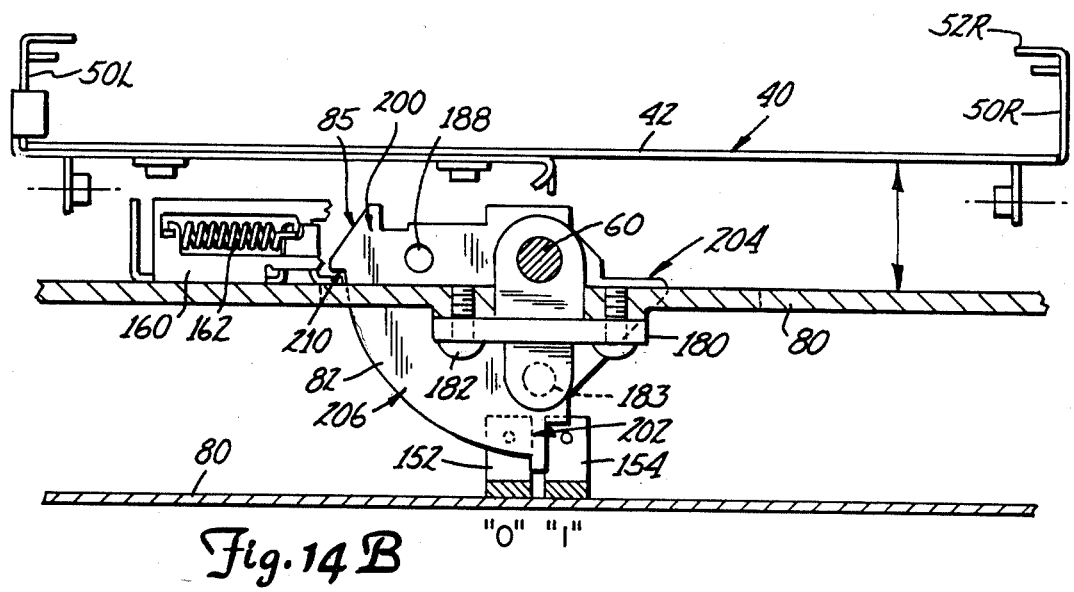
FIG. 14B is a sectional front view of the mechanical subsystem illustrating the front cam plate when the handle is in the run position.
Figure 14D:
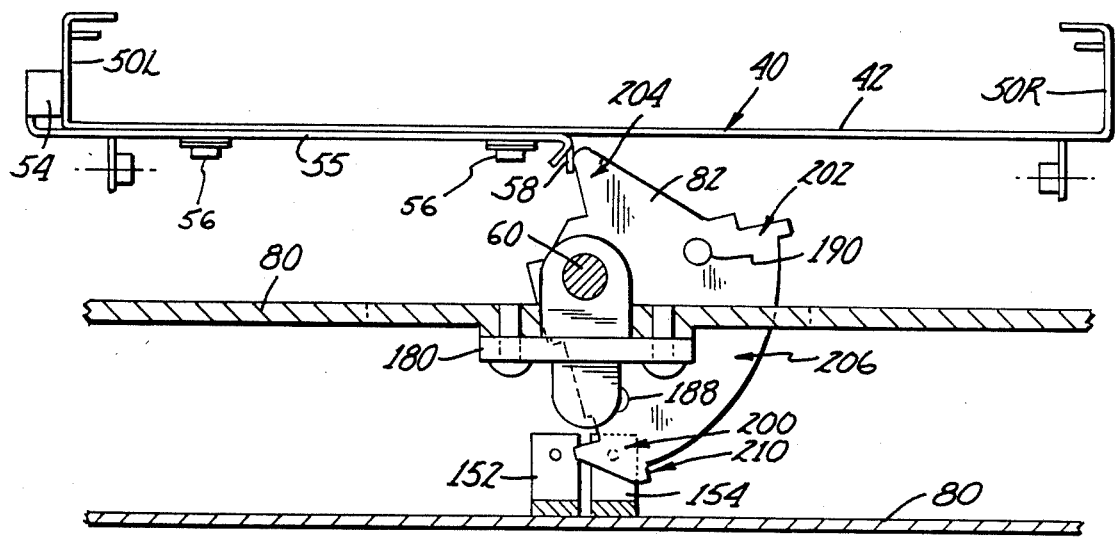
FIG. 14D is a sectional front view of the mechanical subsystem illustrating the front cam plate when the handle is in the eject position.

When handle 20 is rotated clockwise from its load position to its run position (FIG. 12B), cam pin 192 travels to the left along slot section 194 (FIG. 15B), forcing cam follower 64 downward and pan 40 into its run/spin-down position as shown in FIGS. 13B and 14B. While handle 20 is being rotated to its run position, intermediate tab 206 will continuously obstruct both sensors 152 and 154. Once handle 20 reaches its run position, run tab 202 will be rotated clear of sensor 154, while still obstructing sensor 152. Digital signals representative of a "0,1" sequence are therefore provided by sensors 152 and 154 to circuitry 172.

As handle 20 is being rotated to its run position, plate member 85 of cam 62 (FIG. 4) will contact flange 165 of spin-down interlock mechanism 150 (FIGS. 14B and 10), pivoting lever arm 158 against the bias force of spring 162. After handle 20 is completely rotated to its run position, spring 162 will force the lever arm back to its normal position with flange 165 catching edge 210 of plate member 85 and preventing handle 20 from being rotated counterclockwise from the run position until solenoid 156 is actuated.

When handle 20 is rotated clockwise from its run position to its spin-down position (FIG. 12C), cam pin 192 will travel upward within slot section 198 without causing any movement of cam follower 64. Pan 40 will therefore remain in its run/spin-down position as shown in FIGS. 13B and 14C. Run tab 202 will then be rotated out of sensor 152, causing signals representative of digital "1,1" sequence to be provided to circuitry 172.

In response to signals from sensors 152 and 154 indicating that handle 20 is in its load position, control and signal processing circuitry 172 causes disk drive 10 to be operated in a load mode during which all non-essential elements of electrical subsystem 170 are deactivated. Optical disk cartridge 22 can then be inserted into disk drive 10 with door opening mechanism 110 opening door 26 and retaining clip 54 forced into recess 25 to hold the cartridge within pan 40. Electrical subsystem 170 will remain in its load mode as arm 20 is rotated to the run position.

When sensors 152 and 154 provide signals to control and signal processing circuitry 172 indicating that handle 20 has been moved to its run position, electrical subsystem 170 enters its run mode. In its run mode, control and signal processing circuitry 172 actuates drive motor 176 and controls optical head 48 in such a manner that data can be written to and read from optical disk 28.

Handle 20 cannot be rotated directly from its run position back to the load or eject positions. This counterclockwise rotation is prevented by spin-down interlock mechanism 150. When it is desired to discontinue reading and writing operations, or to remove cartridge 22 from disk drive 10, handle 20 must first be rotated in a clockwise direction from the load position to its spin-down position. Handle 20 will then return to its run position in response to the force of spin-down spring 89. In response to signals from sensors 152 and 154 indicating that handle 20 has been moved to its spin-down position, control and signal processing circuitry 172 will first complete any read or write operations being performed to prevent the loss of data. Once these operations are completed, circuitry 172 will deactivate motor 176 and other non-essential elements of electrical subsystem 170.

After a predetermined spin-down period which permits drive motor 176 and therefore optical disk 28 to stop rotating, control and signal processing circuitry 172 actuates solenoid 156, retracting lever arm 158 and permitting handle 20 to be rotated in a counterclockwise manner to its load or eject positions. This spin-down period prevents damage which may otherwise occur to optical disk 28 if it were quickly withdrawn from disk drive 10 while rotating at a high rate of speed. This control feature also allows an operator to stop the operation of disk drive 10 directly through handle 20 without the loss of data.

When handle 20 is rotated to its eject position, eject tab 204 of front cam plate 82 comes into contact with lug 58 of arm 55 as shown in FIG. 14D, forcing retaining clip 54 out of cartridge 10. Cartridge 10 will then be pushed forward by the force of door opening mechanism 110, permitting the cartridge to be withdrawn from the disk drive through opening 18. Handle 20 will be biased toward the load position from the eject position by spring 57.

Although the present invention has been described with reference to preferred embodiments, workers skilled in the art will recognize that changes may be made in form and detail without departing from the spirit and scope of the invention.

What is claimed is:

1. An optical disk drive of the type utilizing an optical disk cartridge formed by an optical disk mounted about a hub within an enclosure, comprising:
   a chassis;
   a drive spindle adapted to engage the hub of the optical disk;
   a drive motor for rotating the drive spindle; pan means movably mounted with respect to the chassis for receiving and supporting the optical disk cartridge;
   a handle having a load position, a run position, and a spin-down position;
   linkage means coupling the handle and the pan means for moving the pan means with respect to the chassis between a load/eject position at which the cartridge can be inserted into and removed from the pan means when the handle is in its load position, and a run/spin-down position at which the hub of the disk is engaged with the drive spindle when the handle is in its run and spin-down positions; and
   control means responsive to the position of the handle for activating the drive motor when the handle is in the run position, and for deactivating the drive motor when the handle is in the spin-down position.

2. The optical disk drive of claim 1 wherein:
   the handle further includes an eject position;
   the linkage means causes the pan means to be in its load/eject position when the handle is in the eject position; and
   the disk drive further includes eject means for ejecting the cartridge from the pan means when the handle is in the eject position.

3. The optical disk drive of claim 1 wherein the linkage means includes a shaft rotatable about a first horizontal axis, and wherein the handle is fixed to the shaft and rotates the shaft as it is moved between its load, run, and spin-down positions.

4. The optical disk drive of claim 3 wherein the linkage means further includes:
   a cam pin spaced from and fixedly mounted with respect to the shaft; and
   a cam follower adapted to receive the cam pin and coupled to the pan means for converting rotational motion of the handled to generally linear motion of the pan means between the load/eject and run/spin-down positions.

5. The optical disk drive of claim 4 wherein the linkage means further includes a yoke positioned between the pan means and pivotally attached to the cam follower for transferring linear motion of the cam follower to the pan means.

6. The optical disk drive of claim 4 wherein the cam follower includes a slot adapted to receive the cam pin.

7. The optical disk drive of claim 4 wherein the cam follower converts the rotational motion of the handle to generally vertical linear motion of the pan means between the load/eject position and the run/spin-down position which is below the load/eject position.

8. The optical disk drive of claim 4 wherein the linkage means further includes detent means for holding the pan in the load/eject and run/spin-down positions when the handle is in the load and run positions, respectively.

9. The optical disk drive of claim 4 and including sensor means coupled to the control means for providing signals representative of the position of the handle.

10. The optical disk drive of claim 9 wherein:
    the linkage means further includes a cam fixedly positioned on the shaft; and
    the sensor means produces signals representative of handle position as a function of the position of the cam.

11. The optical disk drive of claim 10 wherein the sensor means include optical sensors.

12. The optical disk drive of claim 1 and including spin-down interlock means for preventing movement of the handle from the run position to the load position unless the handle is first moved to the spin-down position.

13. The optical disk drive of claim 12 wherein the interlock means is coupled to the control means and permits the handle to be moved from the run position to the load position only after a predetermined spin-down time period has elapsed after the handle is moved to the spin-down position.

14. The optical disk drive of claim 13 and including bias means for biasing the handle from the spin-down position to the run position.

15. The optical disk drive of claim 14 wherein the bias means includes a spring.

16. The optical disk drive of claim 1 wherein:
    the optical disk cartridge includes a slidable door for covering the optical disk and hub when in a closed position, and exposing the optical disk and hub when in an open position; and the optical disk drive further includes a door opening mechanism for opening the door when the optical disk cartridge is inserted into the pan means.

17. The optical disk drive of claim 16 wherein:
the door of the optical disk cartridge includes a recess on a back side; and
the door opening mechanism includes a lever arm pivotally attached to the pan means for engaging the recess in the cartridge door and sliding the door to is open position as the cartridge is inserted into the pan means.

18. An optical disk drive of the type utilizing an optical disk cartridge formed by an optical disk mounted about a hub within an enclosure, comprising:
a chassis;
a drive spindle adapted to engage the hub of the optical disk;
a drive motor for rotating the drive spindle; pan means movably mounted with respect to the chassis for receiving and supporting the optical disk cartridge;
a handle having a load position, a run position, and a spin-down position;
linkage means coupling the handle and the pan means for moving the pan means with respect to the chassis between a load/eject position at which the cartridge can be loaded into and removed from the pan means when the handle is in its load position, and a run/spin-down position at which the hub of the disk is engaged with the drive spindle when the handle is in its run and spin-down positions;
sensor means for sensing the position of the handle;
spin-down interlock means responsive to interlock signals for controllably preventing movement of the pan means from the run/spin-down position to the load/eject position; and
control means responsive to the sensor means for activating the drive motor when the handle is in its run position, deactivating the drive motor when the handle is in its spin-down position, and providing interlock signals causing the spin-down interlock means to permit movement of the pan means from the run/spin-down position to the load/eject position after the handle has been moved from the run position to the spin-down position and a predetermined spin-down time period has elapsed.

19. The optical disk drive of claim 18 wherein the linkage means includes a shaft rotatable about a first horizontal axis, wherein the handle is fixed to the shaft and rotates the shaft as it is moved between its load, run, and spin-down positions.

20. The optical disk drive of claim 19 wherein the linkage means further includes:
a cam pin spaced from and fixedly mounted with respect to the shaft; and
a cam follower adapted to receive the cam pin and coupled to the pan means for converting the rotational motion of the handle to generally linear motion of the pan means between the load/eject and run/spin-down positions.

21. The optical disk drive of claim 20 wherein the linkage means further includes a yoke coupling the pan means and the cam follower for transferring linear motion of the cam follower to the pan means.

22. The optical disk drive of claim 21 wherein the cam follower includes a slot adapted to receive the cam pin.

23. The optical disk drive of claim 22 wherein the cam follower converts the rotational motion of the handle to generally vertical linear motion of the pan means between the load/eject position and the run/spin-down position which is below the load/eject position.

24. The optical disk drive of claim 23 wherein the linkage means further includes detent means for holding the pan in the load/eject and run/spin-down positions when the handle is in the load and run positions, respectively.

25. The optical disk drive of claim 19 wherein:
the linkage means further includes a cam fixedly positioned on the shaft; and
the sensor means include optical sensors for sensing position of the handle as a function of the position of the cam.

26. The optical disk drive of claim 18 wherein the spin-down interlock means includes:
lever means movably mounted with respect to the chassis for engaging the linkage means; and
actuator means coupled to the control means and responsive to the interlock signals for causing the lever means to engage the linkage means when the handle is rotated from the load position to the run position and prevent movement of the handle from the run and spin-down positions to the load position, and for causing the lever means to be disengaged from the linkage means and permit movement of the handle from the run position to the load position in response to the interlock signals.

27. The optical disk drive of claim 18 and including bias means for biasing the handle from the spin-down position to the run position.

28. The optical disk drive of claim 27 wherein the bias means includes a spring.

29. The optical disk drive of claim 18 wherein:
the optical disk cartridge includes a slidable door for covering the optical disk and hub when in a closed position, and exposing the optical disk and hub when in an open position; and
the optical disk drive further includes a door opening mechanism for opening the door when the optical disk cartridge is inserted into the pan means.

30. The optical disk drive of claim 29 wherein:
the door of the optical disk cartridge includes a recess on a back side; and
the door opening mechanism includes a lever arm pivotally attached to the pan means for engaging the recess in the cartridge door and sliding the door to its open position when the cartridge is inserted into the pan means.

31. The optical disk drive of claim 18 wherein:
the handle further includes an eject position;
the linkage means causes the pan means to be in its load/eject position when the handle is in the eject position; and
the disk drive further includes eject means for ejecting the cartridge from the pan means when the handle is in the eject position.

32. The optical disk drive of claim 31 and further including bias means for biasing the handle from the eject position to the load position.

* * * * *

UNITED STATES PATENT AND TRADEMARK OFFICE
CERTIFICATE OF CORRECTION

PATENT NO. : 4,736,356
DATED : April 5, 1988
INVENTOR(S) : Michael V. Konshak

It is certified that error appears in the above-identified patent and that said Letters Patent is hereby corrected as shown below:

Column 9, lines 43-46, delete:

" a drive motor for rotating the drive spindle; pan
means movably mounted with respect to the chas-
sis for receiving and supporting the optical disk
cartridge; "

and insert therefore:

-- a drive motor for rotating the drive spindle;
pan means movably mounted with respect to the chas-
is for receiving and supporting the optical disk
cartridge;--

Column 11, lines 18-21, delete:

"a drive motor for rotating the drive spindle; pan
means movably mounted with respect to the chas-
sis for receiving and supporting the optical disk
cartridge;"

and insert therefore:

--a drive motor for rotating the drive spindle;
pan means movably mounted with respect to the chas-
sis for receiving and supporting the optical disk

UNITED STATES PATENT AND TRADEMARK OFFICE
CERTIFICATE OF CORRECTION

PATENT NO. : 4,736,356
DATED : April 5, 1988
INVENTOR(S) : Michael V. Konshak

Page 2 of 2

It is certified that error appears in the above-identified patent and that said Letters Patent is hereby corrected as shown below:

cartridge;--.

Signed and Sealed this

Nineteenth Day of July, 1988

Attest:

DONALD J. QUIGG

Attesting Officer

Commissioner of Patents and Trademarks